(12) United States Patent
Hugard, IV et al.

(10) Patent No.: US 9,251,351 B2
(45) Date of Patent: Feb. 2, 2016

(54) SYSTEM AND METHOD FOR GROUPING COMPUTER VULNERABILITIES

(75) Inventors: James M. Hugard, IV, Mission Viejo, CA (US); Alexander Lawrence Leroux, Cypress, CA (US); Charles Mallabarapu, Laguna Niguel, CA (US); Jorge Armando Muniz, Costa Mesa, CA (US); Braden C. Russell, Ladera Ranch, CA (US); Zengjue Wu, Aliso Viejo, CA (US)

(73) Assignee: McAfee, Inc., Santa Clara, CA (US)

( * ) Notice: Subject to any disclaimer, the term of this patent is extended or adjusted under 35 U.S.C. 154(b) by 25 days.

(21) Appl. No.: 13/270,946

(22) Filed: Oct. 11, 2011

(65) Prior Publication Data
US 2013/0247207 A1 Sep. 19, 2013

Related U.S. Application Data (63) Continuation of application No. 13/239,271, filed on Sep. 21, 2011.

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |
| G06F 21/57 | (2013.01) |
| H04L 29/06 | (2006.01) |
| G06F 11/30 | (2006.01) |

(52) U.S. Cl.
CPC ............. *G06F 21/577* (2013.01); *G06F 21/57* (2013.01); *H04L 63/1433* (2013.01); *G06F 11/3051* (2013.01); *H04L 63/20* (2013.01)

(58) Field of Classification Search
CPC .............. H04L 63/1433; H04L 63/20–63/308; G06F 21/50; G06F 21/577
USPC ........................................................ 707/774
See application file for complete search history.

(56) References Cited

U.S. PATENT DOCUMENTS

| | | |
|---|---|---|
| 5,987,610 A | 11/1999 | Franczek et al. |
| 6,073,142 A | 6/2000 | Geiger et al. |
| 6,298,445 B1 | 10/2001 | Shostack et al. |
| 6,460,050 B1 | 10/2002 | Pace et al. |

(Continued)

OTHER PUBLICATIONS

"What's new in McAfee Vulnerability Manager 7.0.1", Dec. 16, 2010, McAfee, Inc.*

(Continued)

*Primary Examiner* — Ashok Patel
*Assistant Examiner* — Daniel Potratz
(74) *Attorney, Agent, or Firm* — Patent Capital Group (57) ABSTRACT

A system and method in one embodiment includes modules for creating an asset tag including one or more conditions of an asset on a network, adding the asset tag to an asset report template, and generating an asset report from the asset report template. More specific embodiments include creating the asset tag by generating a query for the one or more conditions. The asset tag may include a second asset tag configured to be updated automatically, and a third asset tag configured to be updated manually, and the second asset tag may be updated automatically when the asset tag is updated. Other embodiments include creating a vulnerability set including a selection of vulnerabilities from a plurality of vulnerabilities, adding the vulnerability set to the asset report template, and scanning a plurality of assets on the network.

20 Claims, 5 Drawing Sheets

(56) References Cited

U.S. PATENT DOCUMENTS

| | | | |
|---|---|---|---|
| 6,546,493 B1 | 4/2003 | Magdych et al. | |
| 7,506,155 B1 | 3/2009 | Stewart et al. | |
| 7,761,918 B2* | 7/2010 | Gula et al. | 726/23 |
| 7,891,000 B1* | 2/2011 | Rangamani | G06F 21/552 709/224 |
| 7,984,057 B2* | 7/2011 | Betz et al. | 707/759 |
| 8,095,984 B2* | 1/2012 | McFarlane | G06F 21/577 380/250 |
| 8,353,043 B2 | 1/2013 | Kim et al. | |
| 8,438,643 B2* | 5/2013 | Wiemer et al. | 726/25 |
| 2003/0212779 A1 | 11/2003 | Boyter et al. | |
| 2003/0233438 A1* | 12/2003 | Hutchinson | G06Q 10/10 709/223 |
| 2004/0006704 A1 | 1/2004 | Dahlstrom et al. | |
| 2004/0073800 A1 | 4/2004 | Shah et al. | |
| 2007/0061885 A1 | 3/2007 | Hammes et al. | |
| 2007/0113285 A1* | 5/2007 | Flowers et al. | 726/23 |
| 2007/0169199 A1 | 7/2007 | Quinnell et al. | |
| 2007/0177615 A1 | 8/2007 | Miliefsky | |
| 2008/0209566 A1 | 8/2008 | Ziv | |
| 2009/0106843 A1 | 4/2009 | Kang et al. | |
| 2010/0281248 A1* | 11/2010 | Lockhart | G06F 11/3612 713/150 |
| 2011/0093954 A1* | 4/2011 | Lee | H04L 63/1433 726/25 |
| 2011/0126288 A1 | 5/2011 | Schloegel et al. | |
| 2012/0304300 A1 | 11/2012 | LaBumbard | |

OTHER PUBLICATIONS

"McAfee Vulnerability Manager 7.0.2", Mar. 21 2011, McAfee, Inc.*

McAfee Vulnerability Manager, Data Sheet, copyright 2010 McAfee, Inc., retrieved and printed on Sep. 20, 2011 from website: www.mcafee.com/in/resources/data-sheets/ds-vulnerability-manager.pdf (2 pages).

McAfee Vulnerability Manager 7.0.1, Last Modified: Dec. 13, 2010, retrieved and printed on Sep. 20, 2011 from website: https://kc.mcafee.com/corporate/index?page=content&id=PD22896&pmv=print (10 pages).

McAfee Vulnerability Manager 7.0.2, Last Modified: Mar. 21, 2011, retrieved and printed on Sep. 20, 2011 from website: https://kc.mcafee.com/corporate/index?page=content&id=PD23047 (32 pages).

What's new in McAfee Vulnerability Manager 7.0.1, copyright 2010 McAfee, Inc., created on Dec. 16, 2010, retrieved and printed on Sep. 21, 2011 from website: https://community.mcafee.com/docs/DOC-2011 (5 pages).

McAfee Vulnerability Manager ePO, Extension 6.8, Installation and Product Guide for ePO 4.0, copyright 2009 McAfee, Inc., retrieved and printed on Sep. 20, 2011 from website: https://community.mcafee.com/thread/23729 (20 pages).

McAfee Vulnerability Manager ePO, Extension 6.8, Installation and Product Guide for ePO 4.5, copyright 2009 McAfee, Inc., retrieved and printed on Sep. 20, 2011 from website: https://community.mcafee.com/thread/23729 (20 pages).

Scan Properties—General Vulnerabilities, published on Jul. 26, 2005, retrieved and printed on Sep. 21, 2011 (3 pages).

Advisory Action received for U.S Appl. No. 13/239,271, mailed on Feb. 11, 2014, 3 Pages.

Final Office Action received for U.S Appl. No. 13/239,271, mailed on Aug. 30, 2013, 8 pages.

Non-Final Office Action received for U.S. Appl. No. 13/239,271, mailed on Feb. 7, 2013, 9 pages.

* cited by examiner

☒ NON-INTRUSIVE
44E — ☒ GENERAL VULNERABILITIES
☐ MISCELLANEOUS
44A — ☒ NETWORK
☐ POTENTIALLY UNWANTED PROGRAMS
44B — ☒ PRINTERS AND PRINT SERVERS
44C — ☒ TROJAN, BACKDOORS, VIRUSES AND MALWARE
☐ UNIX
☐ VOIP
44D — ☒ WEB
☐ WINDOWS
☒ WIRELESS VULNERABILITIES
☒ WIRELESS
☒ WINDOWS VULNERABILITIES
☐ ANTI-VIRUS SOFTWARE
☐ MISCELLANEOUS
☐ NO CREDENTIALS REQUIRED
☒ PATCHES AND HOTFIXES

EXPRESSION: (0 AND 1) OR (2 AND 3) OR (4)
0  {VULNERABILITY SEVERITY CONTAIN LOW, MEDIUM, HIGH — 46A
   AND
1  MODULE EQUALS WINDOWS HOST ASSESSMENT MODULE} — 46B
OR
2  {RISK GREATER THAN 3 — 46C
   AND
3  CATEGORY EQUALS WINDOWS (NON-INTRUSIVE, GENERAL)} — 46D
OR
4  {CVE NUMBER CONTAINS 2010} — 46E

47

EXPRESSION: (0 AND 1) AND (2 AND 3)
0  {ASSET STATUS IS ACTIVE — 48A
   AND
1  VULNERABILITY SET CONTAINED IN WINDOWS RULES} — 48B
AND
2  {ASSET CRITICALITY CONTAINS LOW, LIMITED, MODERATE, SIGNIFICANT, — 48C
EXTENSIVE
   AND
3  SCAN NAME EQUALS WINDOWS SCAN} — 48D

SYSTEM AND METHOD FOR GROUPING COMPUTER VULNERABILITIES

CROSS-REFERENCE TO RELATED APPLICATION

This application is a continuation (and claims the benefit of priority under 35 U.S.C. §120) of U.S. application Ser. No. 13/239,271, filed Sep. 21, 2011, by Inventors James M. Hugard IV, et al., entitled "SYSTEM AND METHOD FOR GROUPING COMPUTER VULNERABILITIES." The disclosure of the prior application is considered part of (and is incorporated by reference in) the disclosure of this application.

TECHNICAL FIELD

This disclosure relates in general to the field of computer networks and, more particularly, to a system and a method for grouping computer vulnerabilities.

BACKGROUND

The field of computer network administration and support has become increasingly important and complicated in today's society. Computer network environments are configured for virtually every enterprise or organization, typically with multiple interconnected computers (e.g., end user computers, laptops, servers, printing devices, etc.). In many such enterprises, Information Technology (IT) administrators may be tasked with maintenance and control of the network environment, including executable software files on hosts, servers, and other network computers. As the number of executable software files in a network environment increases, the ability to control, maintain, and remediate these files efficiently can become more difficult. Generally, greater diversity of software implemented in various computers of a network translates into greater difficulty in managing such software. For example, in large enterprises, executable software inventories may vary greatly among end user computers across departmental groups, requiring time and effort by IT administrators to identify and manage executable software in such a diverse environment. In addition, IT administrators and other users may want to use efficient computer scanning methods to identify and remove vulnerabilities quickly and effectively. When networks have hundreds to millions of nodes, scanning all the nodes for many possible vulnerabilities presents challenges to IT administrators. In many cases, IT administrators may have to run approximately 30,000 vulnerability checks covering thousands of applications and operating systems, and perform dozens to hundreds of new checks in any given week. Thus, innovative tools are needed to assist IT administrators in the effective control and management of executable software files and computer scan methods on computers within computer network environments.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A system and method in one embodiment includes modules for creating an asset tag including one or more conditions of an asset on a network, adding the asset tag to an asset report template, and generating an asset report from the asset report template. More specific embodiments include creating the asset tag by generating a query for the one or more conditions. The asset tag may include a second asset tag configured to be updated automatically, and a third asset tag configured to be updated manually, and the second asset tag may be updated automatically when the asset tag is updated. Other embodiments include creating a vulnerability set including a selection of vulnerabilities from a plurality of vulnerabilities, adding the vulnerability set to the asset report template, and scanning a plurality of assets on the network and other features.

Example Embodiments

Figure 1:
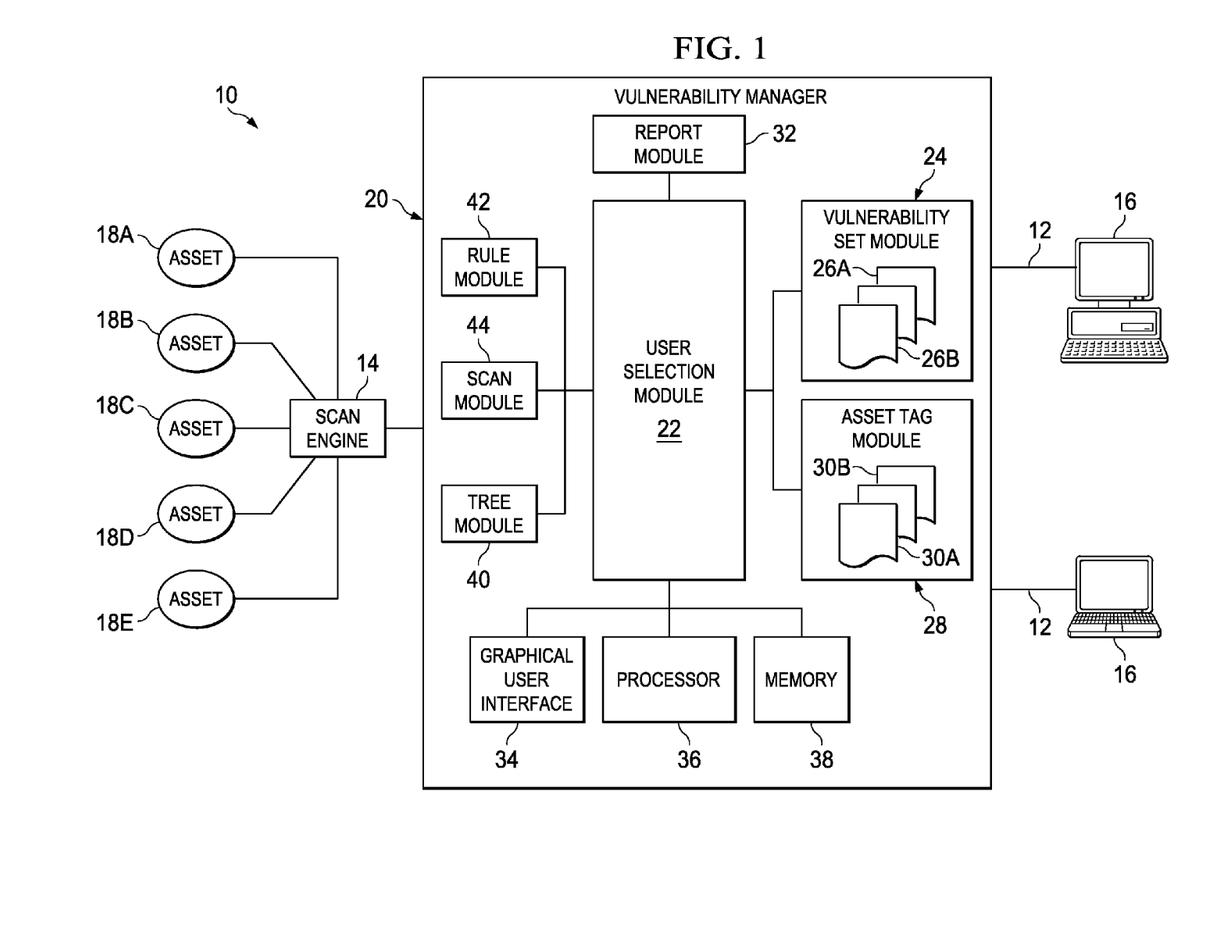
FIG. 1 is a simplified block diagram of an exemplary embodiment in a network environment of a system for grouping computer vulnerabilities.

FIG. 1 is a simplified block diagram illustrating an example embodiment of a vulnerability scan system 10 in a network environment. The exemplary network environment illustrates a network 12 comprising one or more scan engines 14 suitably connected to users 16 and configured to scan various assets 18A-E. An asset may be any electronic device, network element, mobile device, end-user computer, desktop, laptop, client, server, peer, service, application, or other object capable of sending, receiving, or forwarding information over communications channels in a network. A vulnerability manager 20 is coupled to scan engine 14 and is configured to permit users 16 to design and execute customized vulnerability scans on the various assets and obtain reports from the scans. As used herein, the term "vulnerability" encompasses any flaw, condition, security risk, or weakness in a system (e.g., software in an asset, including operating systems, applications, and files) that could result in unauthorized access to the system and a possible security breach or a violation of the system's security policy, organization standards, industry standards, government standards, or the like. Vulnerabilities can exist, for example, in system security procedures, system designs, operating systems, open ports, internal controls, etc. that could be exercised (accidentally triggered or intentionally exploited) and that could result in such breaches or violations.

Vulnerability manager 20 comprises a user selection module 22 suitably connected to a vulnerability set module 24 comprising one or more vulnerability sets 26 (including one or more vulnerability sets 26A and 26B), an asset tag module 28 comprising one or more asset tags 30 (including one or more asset tags 30A and 30B), and a report module 32. A graphical user interface (GUI) 34, one or more processors 36 and one or more memory elements 38 can be accessed by user selection module 22. User selection module 22 communicates with tree module 40, rule module 42 and scan module 44.

Vulnerability sets 26 may be pre-configured groupings of vulnerability content that can be used during scanning and/or during reporting. As used herein, a scan is a program that checks for vulnerabilities in a network. When a scan is run, the program identifies vulnerabilities in various assets in a network. Vulnerability sets 26 can be used in scans to decide which vulnerabilities should be checked on scan targets (i.e., assets). For example, a selected vulnerability set, such as vulnerability set 26A or 26B, may contain certain vulnerabilities in Microsoft® Windows Server Service including: (1) a vulnerability that may allow for remote code execution; (2) a vulnerability that may allow for arbitrary code execution; and (3) a vulnerability that may allow for a denial of service attack. Scan module 44 may be used to generate a scan that includes checks for vulnerabilities included in the selected vulnerability set in various assets 18A-E. Vulnerability sets 26 can also be used in asset reports to decide which assets and vulnerabilities to include in the reports. As used herein, a report is a collection of identified vulnerabilities in a network. Vulnerability manager 20 may provide for creating report templates. As used herein, a report template is a program that searches for selected vulnerabilities in a result of a scan. When a report template is run, a corresponding report comprising a collection of the selected vulnerabilities is generated. Report module 32 may be configured to generate asset reports for assets corresponding to selected vulnerability sets 26 and asset tags 30.

The network environment illustrated in FIG. 1 may be generally configured or arranged to represent any communication architecture capable of electronically exchanging packets. In addition, network 12 may also be configured to exchange packets with other networks such as, for example, the Internet, or other LANs. Other common network elements (e.g., email gateways, web gateways, routers, switches, load-balancers, firewalls, etc.), may also be provisioned in network 12 where appropriate and based on particular needs.

Vulnerability manager 20 can discover and scan assets 18 on network 12, including dynamic/portable assets (e.g., mobile devices, laptops, notepads, smart-phones, etc.) and static assets (e.g., e.g., desktops, printers, etc.). Vulnerability manager 20 can also scan assets located in air-gapped and critical infrastructure environments. An air gap is a security measure for extraordinarily secure computers and computer networks, generally consisting of isolating the secure network physically, electrically, and electromagnetically from insecure networks, such as the public Internet or an insecure local area network. For example, air gapped secure networks are often not allowed an external connection. Any suitable device (e.g., a laptop or virtual scanner) configured with vulnerability manager 20 can be used to discover and scan these assets. The results can remain in the restricted environment or rolled up to report data to a centralized system. For dynamic or portable assets, vulnerability manager 20 can define scan groups while reducing repeated scans. Each scan can be targeted with combinations of asset tags 30, for example, Internet Protocol (IP) address ranges, organizations, system types, etc.

Vulnerability manager 20 can scan, and quickly find vulnerabilities in a plurality of assets 18 on network 12. In an example embodiment, vulnerability manager 20 may provide for a ticketing system to track and verify manual remediation. The breadth and depth of vulnerability scanning of vulnerability manager 20 can permit users 16 to pinpoint vulnerabilities in network 12 with a high level of precision. Vulnerability manager 20 can automatically discover, assess, and report selected vulnerabilities in selected assets in network 12. Vulnerability manager 20 can permit users 16 to monitor progress of the one or more scan engines 14, remotely or locally connected to a scanner, and manage the scanning and reporting process from a single console for a consolidated view of the vulnerability status of network 12. Users 16 can construct separate scan environments using scan module 44 and aggregate select data from the scan results after the fact using report module 32.

For purposes of illustrating the techniques of vulnerability scan system 10, it is important to understand the activities and security concerns that may be present in a given network such as the network shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications. In addition, it will be appreciated that the broad scope of this disclosure intends for references to "programs" to encompass any software file comprising instructions that can be understood and processed on a computer such as, for example, scans, report templates, executable files, library modules, object files, other executable modules, script files, interpreter files, and the like.

Typical network environments, both in organizations (e.g., businesses, schools, government organizations, etc.) and in homes, include a plurality of computers such as end user desktops, laptops, servers, network appliances, and the like, with each computer having an installed set of executable software. In large organizations, network environments may include hundreds or thousands of computers, which can span different buildings, cities, and/or geographical areas around the world. IT administrators are often tasked with the extraordinary responsibility of maintaining these computers and their software in a way that minimizes or eliminates disruption to the organization's activities.

One difficulty IT administrators face when managing a network environment is ensuring that their organization's network security complies with regulatory and industry standards in risk compliance. Companies are under considerable pressure to protect customer information, customer privacy, and sensitive business information against threats from cyber criminals, competitors, and network hackers. For example, business partners may demand increasingly tight compliance in implementing and enforcing IT policies, processes, and controls around key assets and sensitive information. Effective risk management may entail accurate and comprehensive visibility into a company's assets and business processes. Such visibility may include detailed information on assets (e.g., operating system information, network services, applications, etc.) and vulnerabilities (e.g., operating system or application exploitable flaws) in the network. A comprehensive risk management lifecycle generally encompasses: (1) asset discovery; (2) vulnerability detection; (3) risk assessment; (4) remediation; (5) verification; and (6) audit/report.

Currently available risk management software programs can provide a list of assets on corporate networks, and the operating systems, services, and applications running on them. Vulnerability detection mechanisms in such software programs use scanning tools to discover network-based flaws, application vulnerabilities, database issues and configuration errors. Business risk can be established by weighing the severity of the vulnerability, the likelihood of it being exploited, the criticality of the asset and the business impact if the vulnerability is exploited, and the resources for mitigation and remediation. Remediation may be applied within the company's change control process, leveraging ticketing systems or whatever change mechanisms are in place. Verification (e.g., rescanning or other technical validation to verify the remediation's success) is usually performed and an audit/report is generated to document evidence that the vulnerability was discovered, assessed and remediated.

Scans according to such currently available risk management software programs cannot be chosen by severity, Common Vulnerabilities and Exposures (CVE) Number, or Microsoft (MS) Number to be auto-updated. Instead, a set of vulnerability checks are generally chosen during configuration. Unless an entire (vast) category of vulnerabilities are chosen to be checked during configuration, new/updated vulnerabilities or vulnerability checks cannot be included in future scans. Such risk management software programs do not have the capability to scan/report on selected vulnerabilities (e.g., vulnerabilities applicable to applications like Microsoft Word or Internet Explorer), and have those reports delivered to specific people in the organization. Such risk management software programs do not provide a method to choose content at scan or at report time from a rule-based system that can automatically review newer content and properly add/remove content. They also do not provide a capability to scan once, and, generate any desired report; instead, scans are generally targeted to obtain certain information, and any additional information may involve additional scans.

Moreover, such risk management software programs are typically manually operated, with IT administrators manually choosing scans to run based on available templates. For example, several industry standard scan templates are available to test for vulnerabilities applicable to specific regulations and standards (e.g., Health Insurance Portability and Accountability Act (HIPAA), Australian Information Security Manual (formerly known as ASCI 33), BASEL II, Bill 198 also known as Canadian Sarbanes-Oxley (CSOX), CoBIT (industry standards on IT governance), Federal Desktop Core Configuration (FDCC), International Standards Organization (ISO) 17799/ISO 27002/, etc.). Moreover, some scan tests on some templates may overlap with scan tests on another template, leading to task duplication when both templates are selected to be scanned.

When a scan test is updated, for example, by adding a newly discovered vulnerability, the scan configuration including the template is not automatically updated. Thus, if the template is updated, the user would have to create a new scan based on the updated template in order to scan for the updated checks. IT administrators may manually add the updated scan test to the scan or add a new template with the updated scan test. When IT administrators have to manage hundreds and thousands of scan tests, manually updating the scan to add new tests is cumbersome and inefficient.

Moreover, for a proper security enforcement mechanism, an inventory of all assets in an enterprise is useful, and in many cases, necessary. However, maintaining an asset database of all assets may be challenging, in part because the asset list may be maintained in multiple records or lists. Tagging assets with relevant informational tags may aid IT administrators in identifying assets quickly. However, asset characteristics may change over time; for example, an asset that was loaded with Windows XP operating system may be upgraded to Windows 7 operating system. If the asset is tagged based on its previous operating system, the upgrade will not be captured in its asset tag unless a new tag is created. Therefore, there is a need to dynamically tag assets based on its characteristics.

A vulnerability scan system outlined by FIG. 1 can resolve many of these issues. In accordance with one example embodiment of vulnerability scan system 10, a method is provided to create an easy-to-manage grouping of computer vulnerabilities so that they can be re-used and modified and kept up to date to eliminate a lot of task duplication. In addition, many vulnerability scans may be modified at once, and automatically, without having to update each one individually. Thus, in one embodiment, if a change is desired, a vulnerability set may be updated (e.g., new vulnerability added, existing vulnerability modified, vulnerability deleted, etc.). Accordingly, any scans using the updated vulnerability set may be automatically updated (e.g., at runtime) with the updated vulnerability set. Furthermore, scans may be configured to permit users 16 to choose criteria for adding new vulnerability checks to their scans.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Turning to the infrastructure of FIG. 1, the example network environment may be configured as one or more networks and may be configured in any form including, but not limited to, local area networks (LANs), wireless local area networks (WLANs), metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, a communication link may represent a remote connection (e.g., a remote connection to scan engine 14) through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet). In addition, gateways, routers, switches, and any other suitable network elements may be used to facilitate electronic communication between systems, users 16 and scan engine 14. Note that the network illustrated in FIG. 1, may include a configuration capable of transmission control protocol/internet protocol (TCP/IP) communications for the transmission and/or reception of packets in the network. The network could also operate in conjunction with a user datagram protocol/IP (UDP/IP) or any other suitable protocol, where appropriate and based on particular needs.

Using processor 36, memory element 38, and appropriately configured GUI 34, vulnerability manager 20 can permit users 16 to create vulnerability sets 26 in vulnerability set module 24. In an example embodiment, organization and workgroup administrators of an organization can create vulnerability sets 26. Vulnerability sets 26 can be tree-based vulnerability set 26A or rule-based vulnerability set 26B. In an example embodiment, GUI 34 may be configured to permit user 16 to select an option from a drop down menu that displays a choice between a rule based set and a tree based set. When user 16 selects the tree based set, user selection module 22 may call tree module 40 to create tree based vulnerability set 26A.

Figure 2:
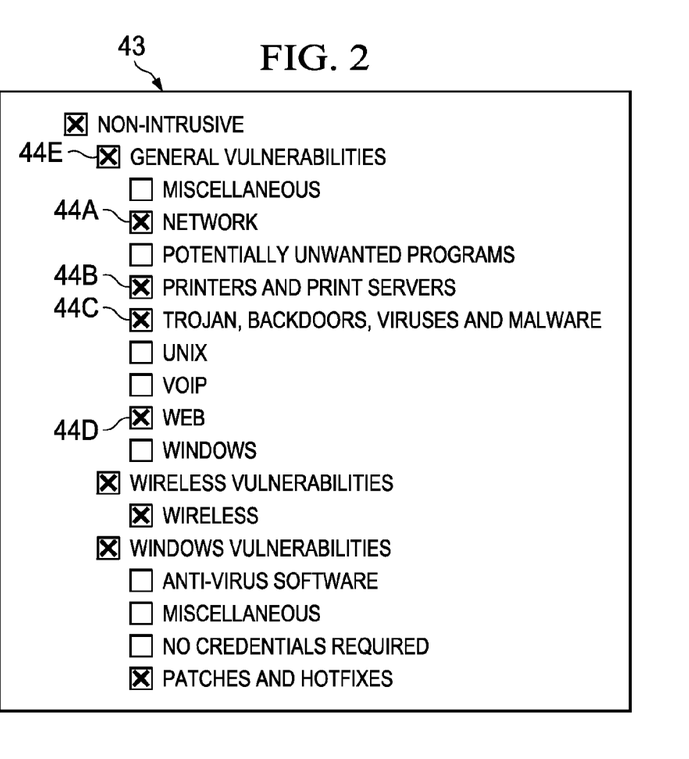
FIG. 2 is a simplified screen shot illustrating an example instance of an embodiment of the present disclosure.

Turning to FIG. 2, FIG. 2 shows an example display screen 43 associated with tree-based vulnerability set 26A according to an example embodiment of the present disclosure. Tree based vulnerability set 26A may include at least one vulnerability selected from a plurality of vulnerabilities. In the example embodiment shown in FIG. 2, a tree comprising a plurality of vulnerabilities may be comprised of a outlined list of vulnerabilities, with options for user 16 to select desired vulnerabilities. In the figure, checked items indicate user selection. For example, vulnerabilities 44A-D labeled as "Network," "Printers and Print Servers," "Trojan, Backdoors, Viruses and Malware," and "Web," respectively, under 44E "General Vulnerabilities" have been selected to be included in a vulnerability set.

Tree module 40 can configure tree-based vulnerability set 26A outside of a scan configuration and allow multiple scan configurations to utilize the same selection of vulnerabilities. Tree module 40 can also allow user 16 to update the vulnerability selection in the tree without stopping, modifying, and re-scheduling an existing scan. For example, modifications can be made outside the scan configuration (e.g., in vulnerability set 26A) and at the next run time, the updated vulnerability set can be used. Thus, a scan may be updated by adding a new vulnerability to the plurality of vulnerabilities, and modifying the previously saved vulnerability set by selecting/adding the new vulnerability. In an example embodiment, tree based vulnerability set 26A may use a hierarchical tree where individual scans are organized, for example, by module and category. Each category can be set to update automatically when new vulnerabilities are added to that category.

Figure 3:
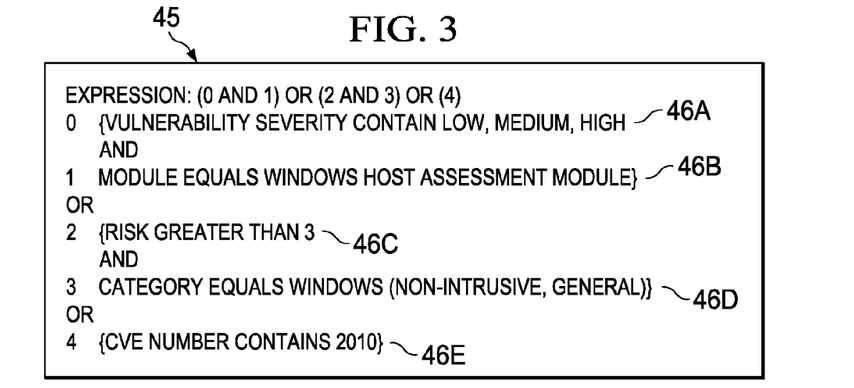
FIG. 3 is a simplified screen shot illustrating an example instance of another embodiment of the present disclosure.

Turning to FIG. 3, FIG. 3 illustrates an example display screen 45 associated with a query for rule-based vulnerability set 26B according to an example embodiment of the present disclosure. When user 16 selects the rule based set from the drop down menu, user selection module 22 may call rule module 42 to create rule-based vulnerability set 26B.

Rule module 42 may configure rule-based vulnerability set 26B from a "query" like set of rules that can be used to determine which vulnerability checks are in the scan or report. As used herein, the term "query" includes a request for information retrieval comprising a logical expression of conditions. Rule based vulnerability set 26B may be created by generating a query including a nested condition expression associated with one or more vulnerabilities (e.g., defines vulnerabilities to be selected) in a plurality of vulnerabilities and by running the query during a scan. When the query runs, all vulnerabilities meeting the nested condition expression are added to rule-based vulnerability set 26B. Thus, each time a scan is run, the nested condition expression is evaluated to determine which vulnerability checks should be run in the scan. This method can ensure that scans are always up-to-date.

Rule based vulnerability set 26B allows user 16 to keep scans up-to-date without manually changing vulnerability sets or any scans. For example, if user 16 wants to include all vulnerabilities with a particular Microsoft Security Bulletin number (MS-Number) in a scan, a rule for that MS-Number may be created (e.g., in the form of a query) and all vulnerabilities with that MS-Number can be included in the scan, regardless of when those vulnerabilities were added (e.g., rule may be created before a new vulnerability with that MS-Number is added to a list of known vulnerabilities).

GUI 34 may be suitably configured to allow user 16 to create the nested condition expressions, for example, using AND/OR logic. AND logic searches for any vulnerability containing all of the conditions specified in the nested group. OR logic searches for any vulnerability containing any of the conditions specified in the nested group. In an example embodiment, the nested condition expression using AND/OR may allow the following operators: EQ—Equals; NE—Not Equals; GT—Greater Than; LT—Less Than; GE—Greater Than or Equal; LE—Less Than or Equal; Contains; and Does not Contain. Example conditions include vulnerability category, CVE Number, Common Weakness Enumeration (CWE), intrusive check, module (e.g., General Vulnerability, Windows Host, Wireless, Shell, or Web), MS Number, risk, specific vulnerability, vulnerability name, vulnerability severity, etc. In an example embodiment, when vulnerability set 26B is saved, vulnerability manager 20 may convert the query into a Structured Query Language (SQL) statement. The SQL statement may be saved and used to get the selected vulnerabilities when user 16 previews vulnerability set 26B, or runs a scan using rule based vulnerability set 26B. The rules may be saved as an XML document and presented to the user in GUI 34 when user 16 calls user selection module 22. In one embodiment, SQL statements and/or XML documents may be stored in a database with vulnerability sets 26.

In an example embodiment, a query may be as formed as shown in FIG. 3. The query expression may be a combination of AND and OR expressions. The vulnerability set selected from running the example query as shown in the figure includes vulnerabilities associated with statements 46A-E (e.g., at least one of statements (0 and 1), (2 and 3) and (4)). For example, 46A (statement 0) includes vulnerability sets that have been labeled with severity levels of low, medium or high. 46B (statement 1) includes modules that contain Windows Host Assessment Module. A query for 46A and 46B statement 0 and 1 includes vulnerabilities associated with Windows Host Assessment Module and have been labeled with severities of low, medium or high.

This rule based method can provide at least two advantages: 1) it allows content selection to be based in "real world terms," for example, report on all high and medium risk vulnerabilities where the vulnerability name contains product or enterprise names such as "Internet Explorer," or "Acrobat," or "Flash," or "QuickTime," etc.; and 2) rule based vulnerability set 26B may be assessed at every scan or report run so any new/updated vulnerability content can automatically be included. To update a scan to add a new vulnerability, the query may simply be re-run to include the new vulnerability in the scan.

In an example embodiment, content in vulnerability set 26B can be auto-updated using rule module 42. For example, user 16 may build scans that can seek multiple types of vulnerabilities, such as "scan for all high and medium risk vulnerabilities" AND "have the scan update the content every time the scan or report is run so that the latest high and medium risk vulnerabilities are included." To create such scans with rule-based vulnerability set 26B including the above specifications, user 16 can run a vulnerability set wizard in vulnerability set module 24 using appropriately configured GUI 34. In an example embodiment, GUI 34 may be configured to run a software wizard when user 16 clicks on a "Create New" button. A new rule-based vulnerability set 26B may be created under a suitable name, for example, user 16 may type a name such as "Latest High and Medium Risk Vulnerabilities." User 16 may then select the rule based option rather than the tree based option from the drop down menu in order to create a list of checks for vulnerability set 26B.

In an example embodiment, a default rule that the vulnerability is non-intrusive may be pre-set according to rule module 42. User 16 can add custom rules to rule module 42. In the example embodiment, user 16 may add rules with a desired logic, for example, "High or Medium" vulnerability. In an example embodiment, GUI 34 may be configured to permit user 16 to add a condition and choose from a pull down menu showing vulnerability severity. Alternatively, GUI 34 may be configured to permit user 16 to type in the desired vulnerability severity. When user 16 selects the condition "contains" and chooses "High" and "Medium" severity, a new rule that can return a set of vulnerability content based on "non-intrusive AND high OR medium severity vulnerabilities" can be created. Scans and reports that are based on this vulnerability set 26B (i.e., vulnerability set with the name "Latest High and Medium Risk Vulnerabilities") may evaluate the corresponding rule prior to running the scan or report. Thus, user 16 can get the latest set of content that matches the rule.

According to another example embodiment, rule module 42 may contain features that allow users 16 to easily build complex expressions for inclusion and exclusion of vulnerabilities for scanning and reporting. For example, users 16 may scan or report on vulnerabilities that apply to, for example, Microsoft Word, Mozilla Firefox, Safari or some other details. To build a rule-based vulnerability set with a more complex expression, a new vulnerability set with a suitable name (e.g., "Application Vulnerabilities") may be created according to a custom rule, for example, designed by an expression that may scan or report on vulnerabilities in desktop applications that are of interest. In an example embodiment, user 16 may add an addition to the existing default rule (e.g., "intrusive equals no"). The added condition may be a nested group with a logic of: "vulnerabilities in application 1" OR "vulnerabilities in application 2" etc.

Figure 4:
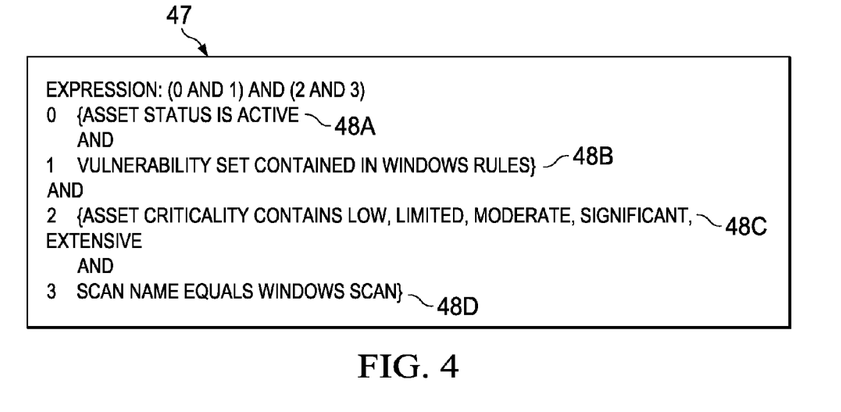
FIG. 4 is a simplified screen shot illustrating an example instance of yet another embodiment of the present disclosure.

Turning to FIG. 4, FIG. 4 shows an example display screen 47 associated with asset tags 30 according to embodiments of the present disclosure. Asset tag module 28 in vulnerability manager 20 can be used to generate asset tags 30 and assign asset tags 30 to one or more assets 18. Thus, users 16 (e.g., organization administrators) can organize their assets with similar asset tags 30. Users 16 can create static asset tags 30A (e.g., labels that organization administrators create to organize assets by operating system, department, or location) and apply them manually to assets 18. Static asset tags 30A can be created based on an operating system (e.g., Windows or Ubuntu), department (e.g., warehouse or finance), or location (e.g., North America or Europe). In an example embodiment, static asset tags 30A can be created by a user 16 using appropriate graphical user interface (GUI) 34. A new asset tag 30 may be created in GUI 34, for example, by typing the name of asset tag 30A (e.g., "Windows 7") in an appropriate text box as provided. GUI 34 may be configured to enter more than one asset tag at a time. Asset tags 30 may be sorted alphabetically and suitably displayed in GUI 34. Once static asset tags have been created, users 16 can apply the appropriate asset tags (e.g., static asset tag 30A) to assets, for example, to improve results of searching or browsing for assets.

GUI 34 may be configured to permit users 16 to rename static asset tag 30A. When static asset tag 30A is renamed, relevant assets using that tag can be updated automatically, including scan configurations, asset report templates, and any asset tags that reference the updated asset tag. In an example embodiment, GUI 34 may be configured to select an asset tag to rename. GUI 34 may also be configured to delete asset tags. When static asset tag 30A is deleted, the asset tag may be removed from relevant assets using that tag. In an example embodiment, in an asset report or a dynamic asset tag referencing static asset tag 30A, deleted tags appear as "<Deleted Asset Tag>". In scan configurations, the deleted asset tag may be removed entirely from the scan target page.

Multiple tags 30 can be applied to one or more assets to narrow a search for specific assets. For example, using multiple asset tags 30, administrators can tag all Windows assets that belong to the finance department located in North America. Users 16 can search or browse for assets 18 in a scan configuration, generate an asset report using report module 32, and manage assets 18 based on asset tags 30. In an example embodiment, GUI 34 may be configured to present user 16 with a search and select tool of assets that allows selecting multiple assets at a time. GUI 34 can be configured to apply the newly created tag to selected assets or all assets across all search result pages.

Asset tag module 28 may also permit creating dynamic asset tag 30B. Dynamic asset tags 30B may be applied automatically or manually. Dynamic asset tags 30B can be used in scan configurations, asset report templates, referenced in another dynamic asset tag, or searching for assets. Dynamic asset tags 30B may also be generated using a query based on asset filters, using various criteria. For example, assets 18 can be filtered by operating system, asset criticality (e.g., how important the asset is to the company), and severity of a vulnerability found on the asset. In an example embodiment, running the query applies dynamic asset tag 30B to assets 18 that meet the filter criteria. In another example embodiment, users 16 can filter for all assets with a particular operating system and with a high criticality level that have one or more severe vulnerabilities.

In an example embodiment as shown in FIG. 4, a query for dynamic asset tag 30B may include an expression containing AND and OR statements. For example, a query may generate asset tags for assets that meet conditions embodied in statements 48A-D (i.e., statements 0, 1, 2, and 3). Thus, assets that have an active status, with associated vulnerability sets contained in "Windows Rules," with asset criticality of low, limited, moderate, significant or extensive, and a scan name of "Windows Scan" will be tagged with the selected asset tag name.

Users 16 may add asset filters to a query. Queries containing asset filters may also be referred herein as "asset filter expressions." When the query runs, the name of dynamic asset tag 30B is applied to any asset that meets the conditions of the asset filters. Asset tag options (e.g., commands such as ADD, DELETE, EDIT etc.) may be used to generate the query using asset filters. The following table lists some dynamic asset tag options that may be used in generating a query:

| Option | Description |
| --- | --- |
| Add condition | Add a condition at the current level in the hierarchy |
| Add nested condition | Create a new condition on a new child-level in the hierarchy. Nested conditions share the same operator. |
| And/Or | Toggle between "AND" and "OR." It affects all conditions within the same hierarchical level. AND: search for any record containing all of the conditions specified in the nested group. OR: search for any record containing any of the conditions specified in the nested group. |
| Delete this condition | Remove a condition from the criteria list. |

-continued

| Option | Description |
|---|---|
| Delete this condition group | Remove the conditions contained within a group. |
| Edit | Make changes. |
| Enable automatic tagging | The asset tag is updated every time it is used in a scan configuration, asset report template, or asset search. |
| Expression | Generate a summarized expression of the conditions entered in the filter. Each condition is represented by a number in the expression. For example, the following expression shows a filter with six conditions: 1 and (2 and (3 or 4) and 5) and 6. |
| Tag name | The name of the dynamic asset tag. |

In an example embodiment, GUI 34 may be configured to deselect automatic tagging to permit running a query for dynamic asset tag 30B manually. GUI 34 may be configured to add conditions or nested conditions to create an appropriate query. For example, GUI 34 may be appropriately configured to select a condition and applicable criteria (e.g., criterion "high" for condition "vulnerability severity") from a drop-down list. The following table lists some conditions and their descriptions for generating dynamic asset tags 30B:

| Setting | Description |
|---|---|
| Asset criticality | Filter assets by criticality level: None, Low, Limited, Moderate, Significant, or Extensive. Select to include or exclude the designated levels. Select multiple levels of criticality to include in a report. |
| Asset Group Name | Filter assets by the group name of a given asset. Select to include or exclude the group name from the report. Enter partial information and select whether the selection starts or ends with the partial information. |
| Asset Label | Filter assets by the label of a given asset. |
| Asset Owner | Filter assets by an owner's name. GUI 34 may be configured to have a setting to either include or exclude any assets associated with the owner for the report. |
| Asset Status | Filter assets by the status of an asset. In an example embodiment, an asset can be "Active," "Inactive," or "Undiscovered." Undiscovered may mean the asset was added manually but has not been discovered by a scan. |
| Asset Tag Set | Filter assets by an asset tag. |
| Authentication stats | Filter assets based on the success or failure of WHAM or Secure Shell (SSH) authenticated access. |
| Banners | Filter assets by banner information. |
| CVE number | Filter assets by CVE number to filter by a specific vulnerability. |
| False Positives | Filter assets by those that have at least one false positive associated with it, or have no false positives associated with it. |
| Host DNS Name | Include or exclude any assets with a specific Host domain name system (DNS) name. |
| Host NetBIOS Name | Set the filter to include or exclude any assets with a specific Host NetBIOS name. |
| IAVA Number | Filter the asset by a IAVA (Information Assurance Vulnerability Alert) number for the filter. |
| IP Address | Filter the asset by IP Address(es) or IP Address Range. |
| KB Number | Filter the asset by Microsoft KnowledgeBase ID Number(s). KnowledgeBase Numbers describe artifacts related to Microsoft products, including technical support. |
| Open ports | Filter assets based upon the open ports on a system. |
| Operating system | Determine which operating systems to include or exclude from the report. |
| Protocol Name | Identifies all assets with at least one TCP or UDP port open (based on configuration selected). |
| Scan Name | Identifies all scan configurations that map to the scan name, then extracts all IP ranges allowed for that scan configurations, and then finds assets within the allowed IP ranges. |
| Vulnerability Name | Filter the asset by a vulnerability name. |
| Vulnerability Severity | Filter the asset by vulnerability severity level(s). |
| Vulnerability Set | Filter assets based on vulnerabilities found on the asset that are part of a vulnerability set. |

When dynamic asset tag 30B is set to enable automatic tagging, asset tag 30B may be updated every time it is used in a scan configuration, asset report template, or asset search. In certain situations (e.g., dynamic asset tag 30B is applied to more than 20,000 assets or asset filter conditions are complicated, as in returning all vulnerabilities, etc.), users 16 can deselect automatic tagging and update dynamic asset tag 30B manually as desired. In an example embodiment, asset tag module 28 may have a default setting where it will not run again if less than a pre-defined amount of time (e.g., 10 minutes) has elapsed since the tag was last run. For example, this may reduce the possibility of having multiple users trying to update the same query within a short period of time. In an example embodiment, if a query is to be updated within the 10 minutes, organization administrators can manually apply asset tag 30B to selected assets 18.

In another example embodiment, updating dynamic asset tag 30B is affected if it is referenced by another dynamic asset tag, and if the dynamic asset tags are set to update automatically or manually. For illustrative purposes only and not as a limitation, assume that Tag A is set to Auto (i.e., auto-update) and references Tag B and Tag C. Tag B is set to Manual (i.e., manual update) and references Tag D. Tag D is set to Auto. Tag C is set to Auto and references Tag E, Tag F, and Tag G. Tags E and G are set to Auto. Tag F is set to Manual. The tags may be viewed as a hierarchy as shown in the table:

| |
|:---:|
| Tag A (a) |
| Tag B (m) |
| Tag D (a) |
| Tag C (a) |
| Tag E (a) |
| Tag F (m) |
| Tag G (a) |

When Tag A is updated, Tags C, E, and G are updated. Because Tag B is set to Manual, both Tag B and Tag D are not updated. Tag F is set to Manual and is not updated. When Tag B is manually updated, Tag D is updated automatically. When Tag C is updated, Tags E and G are updated automatically. Tag F must be updated manually. In the example embodiment, updating is performed from the bottom up, so updating Tag A updates Tags E and G, then Tag C, and finally Tag A. In the example embodiment, since Tags E and G are on the same level, there is no priority in updating Tags E and G.

When dynamic asset tag 30B is set to automatically update, the query associated with dynamic asset tag 30B may run every time the tag is used. For a large number of assets 18, updating dynamic asset tag 30B may take a long time. This can lengthen the time for a scan or asset report to finish running. For a large number of assets 18, users 16 may manually update dynamic asset tag 30B before running a scan configuration or asset report that contains this asset tag. Every time dynamic asset tag 30B is updated, asset tag 30B looks for changes since the last time asset tag 30B was updated.

When user 16 edits dynamic asset tags 30B, the asset tag is updated the next time it is applied or used. In an example embodiment, GUI 34 may be configured to permit user 16 to change the name of dynamic asset tag 30B (and the change is applied where the tag is used), and add or remove asset filters. In another example embodiment, GUI 34 may be configured to permit user 16 to delete dynamic asset tags 30B. When dynamic asset tag 30B is deleted, the asset tag is removed from all assets using that tag. In an asset report or a dynamic asset tag referencing the asset tag, deleted tags appear as <Deleted Asset Tag>. In scan configurations, deleted asset tag 30B is removed from the scan target page. An example embodiment may also permit users 16 to duplicate a dynamic asset tag. Duplication allows users 16 to start with an existing set of conditions and modify it to create a new one.

In a scan configuration, users 16 can browse for assets 18 based on one or more asset tags 30. In an example embodiment, GUI 34 may be configured to present a folder tree comprising a plurality of asset tags when user 16 browses by asset tag 30. In a scan configuration, users 16 can search for assets 18 based on a search type, like asset tag set, IP address, or operating system. Users 16 can search for assets 18 using asset tags 30, then assign other properties to those assets (e.g., criticality level or owner). Static asset tags are applied before the tags can be used in an asset search. In an asset report template, administrators can add one or more conditions to the asset filter and generate an asset filter expression to include or exclude assets based on one or more asset tags 30.

According to embodiments of the present disclosure, users 16 can generate a scan configuration with selected vulnerabilities on selected assets. User selection module 22 may call scan module 44 to generate the scan configuration. In an example embodiment, GUI 34 may be appropriately configured to permit user 16 to choose vulnerability sets 26 to be included in the scan. Scan engine 14 may call scan module 44 and run the scan on assets 18 for the selected vulnerabilities in vulnerability set 26.

According to an example embodiment of the present disclosure, by utilizing vulnerability set module 24 and asset tag module 28 of vulnerability manager 20, users 16 may significantly improve how they scan and report vulnerabilities. The old method of vulnerability scanning, essentially a model of "scan to produce a report," is resource intensive, as each asset is scanned multiple times if multiple reports are desired. According to embodiments of the present disclosure, scanning may be used to fill a repository (e.g., a database) with unique vulnerabilities on a specific asset 18. User 16 may simply scan every asset 18 for vulnerabilities (e.g., using substantially all non-intrusive checks) in system 10. A vulnerability repository may thus be continually filled with up-to-date vulnerability data whenever scans are run.

Utilizing vulnerability set module 24 in vulnerability manager 20 may allow user 16 flexibility in their reporting, for example, to build and deliver reports with selected data to a selected audience. In an example embodiment, report module 32 may build reports based on vulnerability set 26 and appropriate asset tag 30 using an appropriately configured GUI 34. For example, GUI 34 may be configured with a link to generate a report, for example, from a new custom report template. In an example embodiment, GUI 34 may be configured to give the report template a name like "High and Medium Risk Application Vulnerabilities."

Creating a vulnerability report may be analogous to a SQL query; however, the vulnerability report creation may not involve knowledge (or even access) to any database. User 16 may add vulnerability set 26 to a report template by generating a query including one or more conditions associated with vulnerability set 26. After running the scan, user 16 may generate a report from the report template, and the report may comprise one or more results from the scan meeting the conditions associated with vulnerability set 26 that are specified in the query of the report template. Users 16 may choose assets 18 to include in the report based on asset tags 30. GUI 34 may be configured to add a new condition, for example, one or more vulnerability sets (e.g., named "Windows Vulnerabilities" including vulnerabilities associated with Windows operating system). When report module 32 is run, the generated report may contain information pertaining to assets associated with the selected vulnerability sets (e.g., "Windows Vulnerabilities" and "High and Medium Risk Application Vulnerabilities"). The report template may be automatically updated when vulnerability set 26 is updated with a new vulnerability, such that when the updated report template is run, the corresponding report that is generated may include the new vulnerability.

Report module 32 may be configured to generate a report immediately, or schedule the report for later delivery to selected persons. When rule-based vulnerability sets 26B are used in the report template creation, the vulnerability set rules may be evaluated every time the report is scheduled to run; thus giving users 16 the latest set of vulnerability information that matches criteria in the selected vulnerability set. Such a "scan once, report many . . . " model may allow more efficient vulnerability scanning (e.g., impacting assets when the data is refreshed) and more powerful reporting by customizing the output. To generate another report with a completely different set of criteria, re-scanning network 12 may not be called for; instead, a new report template with new criteria (e.g., conditions) may be generated and run on the previously scanned information.

Vulnerability manager 20 may be implemented on a physical or virtualized hardware connected to network 12, or may be implemented on specialized devices configured to scan networks. Not shown in vulnerability scan system 10 of FIG. 1 is hardware that may be suitably coupled to vulnerability manager 20 in the form of consoles, user interfaces, processors, memory elements, memory management units (MMU), additional symmetric multiprocessing (SMP) elements, peripheral component interconnect (PCI) bus and corresponding bridges, small computer system interface (SCSI)/integrated drive electronics (IDE) elements, etc. In addition, suitable modems and/or network adapters may also be included for allowing network access. Any suitable operating systems may also be configured in vulnerability manager 20 to appropriately manage the operation of hardware components therein. Vulnerability manager 20 may include any other suitable hardware, software, components, modules, interfaces, or objects that facilitate the operations thereof. This may be inclusive of appropriate algorithms and communication protocols that facilitate the selective grouping and managing operations detailed herein.

Figure 5:
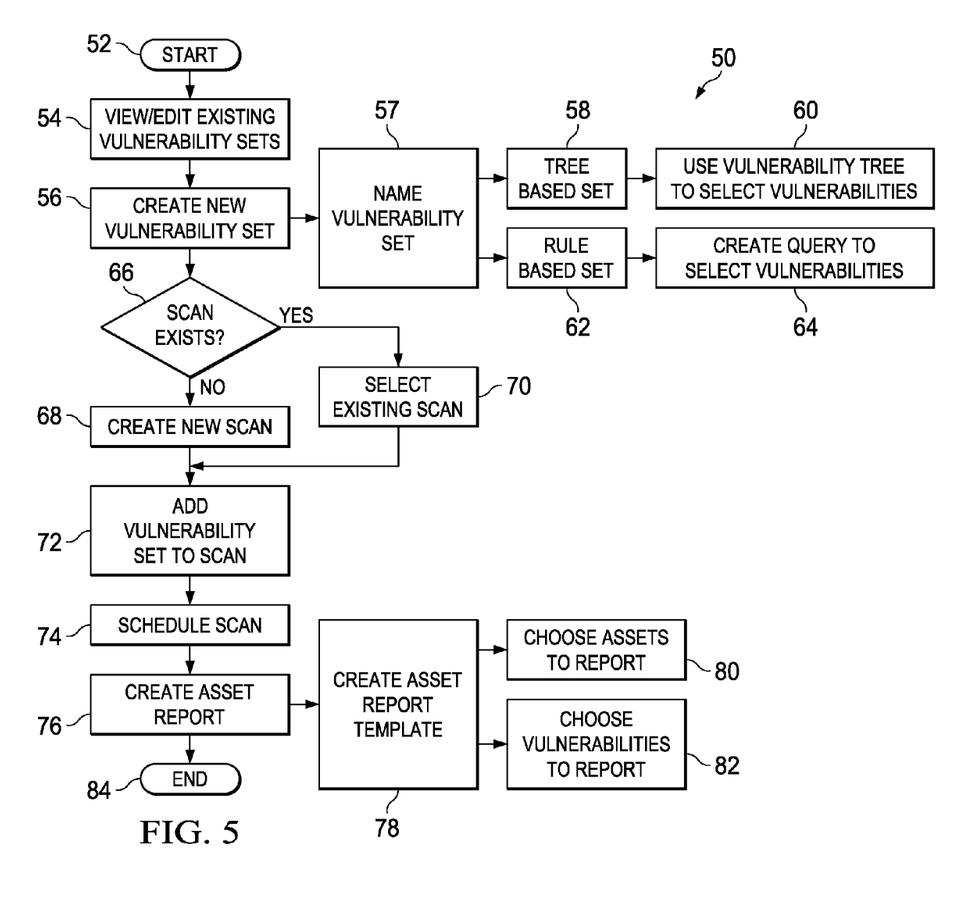
FIG. 5 is a simplified flow-chart illustrating example operational steps associated with embodiments of the present disclosure.

Turning to FIG. 5, FIG. 5 is a flow-chart illustrating example operational steps associated with method 50 according to embodiments of the present disclosure. Method 50 begins in step 52 when vulnerability manager 20 is activated by user 16, or by automatic scan scheduling software running on scan engine 14. In step 54, user 16 may view or edit existing vulnerability sets 26 in vulnerability set module 24. In an example embodiment, GUI 34 may be appropriately configured to display a list of vulnerability sets 26. In step 56, user 16 may create a new vulnerability set using user selection module 22. In step 57, a new vulnerability set is named. If user 16 selects a tree based vulnerability set 26A in step 58, user selection module 22 calls tree module 40, which uses a vulnerability tree to permit user 16 to select vulnerabilities in step 60. If user 16 selects a rule based vulnerability set 26B in step 62, user selection module 22 calls rule module 42, which allows the user to create an appropriate query to select vulnerabilities in step 64.

After the new vulnerability set is created in step 56, scan module 44 may check whether a scan exists in step 66. If a scan exists, the existing scan may be selected in step 70. Otherwise a new scan may be created in step 68. In step 72, the new vulnerability set 26A or 26B may be added to the scan. In step 74, the scan may be scheduled to run immediately or at some later time. When the scan is launched, scan engine 14 may run the scan and determine the existence of vulnerabilities in assets 18 in network 12. For a tree based vulnerability set, the scan may test for each of the vulnerabilities included in the tree based vulnerability set. For a rule based vulnerability set, the query is run to determine which vulnerabilities should be checked during the scan. Once the query is completed, the scan may test for each of the vulnerabilities identified by the query.

In step 76, user 16 can create an asset report using report module 32. An asset report template may be created in step 78, and appropriate assets chosen for reporting in step 80 using appropriate asset tags 30. Vulnerability sets may be used in asset tags 30 to create a logical expression that selects assets. For example, asset tag 30B may include a rule that the asset status is active and that a vulnerability of the asset is contained in a particular vulnerability set. Accordingly, assets meeting these criteria may be tagged with asset tag 30B (or the asset may be included within asset tag 30B). In step 80, assets may be chosen for reporting purposes based on asset tags 30, and/or any vulnerabilities they have and vulnerabilities from those assets may be reported even if such vulnerabilities are not within the particular vulnerability set associated with asset tag 30A or a particular vulnerability set of the asset report. Alternatively (or additionally), a particular vulnerability set 26 may be chosen in step 82 to choose the vulnerabilities to be included in the asset report. When report module 32 runs, the asset report is populated with selected vulnerability information on the selected assets. The process terminates in step 84. In other embodiments, asset tag 30 may be created prior to, concurrently with, or subsequent to, creating vulnerability set 26. Asset tag 30 may also be previously stored and accessed in step 78.

Figure 6:
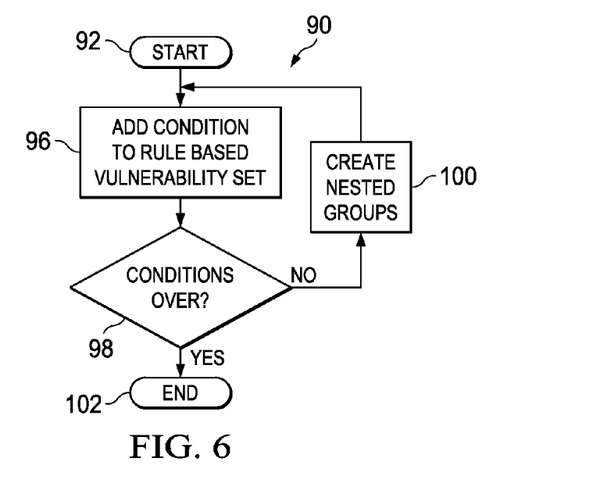
FIG. 6 is a simplified flow-chart illustrating additional details of an example embodiment of the present disclosure.

Turning to FIG. 6, FIG. 6 is a flow illustrating details 90 of method 50 according to an embodiment of the present disclosure. Method 90 starts in step 92 when a rule module 42 is called by user selection module 22. In step 96, a condition is added to a query. In step 98, rule module 42 may check to determine if conditions in the query are over. If not over, nested groups of conditions may be created in step 100 by looping back to step 96 to add conditions. If conditions are over as determined in step 98, the process ends in step 102. The rule based vulnerability set 26B created by process 90 may be saved in vulnerability set module 22 for future use in scanning and generating reports.

Figure 7:
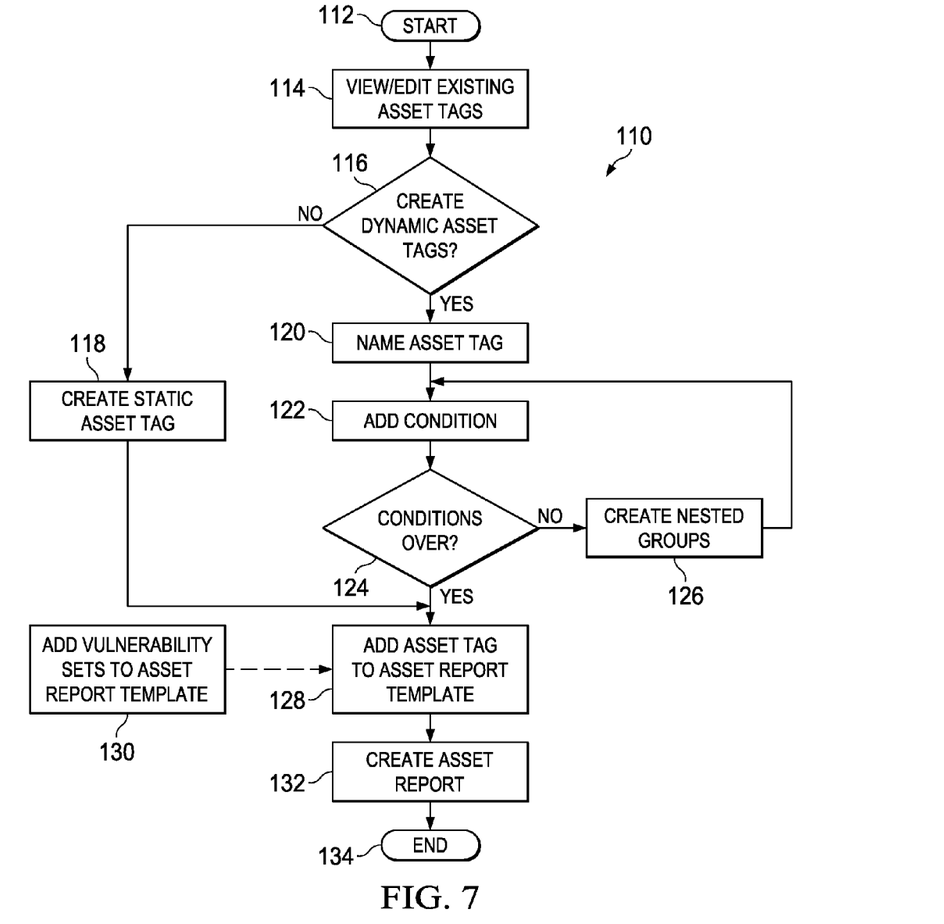
FIG. 7 is a simplified flow-chart illustrating example operational steps associated with embodiments of the present disclosure.

Turning to FIG. 7, FIG. 7 is a flow-chart illustrating example operational steps associated embodiments of the present disclosure. Method 110 begins in step 112 when asset tag module 28 is activated, for example, by vulnerability manager 20. In step 114, user 16 may view or edit existing asset tags in asset tag module 28. In an example embodiment, GUI 34 may be appropriately configured to display a list of asset tags 30. In step 116, a decision to create dynamic or static asset tags may be made. If user 16 decides to select static asset tag 30A, GUI 34 may be appropriately configured to permit user 16 to create static asset tag 30A in step 118, for example, by naming asset tag 30A and/or selecting the criteria for tagging (e.g., operating system, department, location, etc.). Appropriate assets may be tagged with static asset tag 30A.

If user 16 decides to create dynamic asset tag 30B, user selection module 22 may call rule module 42. GUI 34 may be appropriately configured to permit user 16 to name dynamic asset tag 30B in step 120. In step 122, a condition (e.g., with appropriate filters for asset criticality, asset owner, asset group name, asset status, banner selection, etc.) may be added to a query. One or more vulnerability sets may also be included in an asset tag. Furthermore, tags may be referenced within tags (e.g., include all ABC systems OR all systems that have been manually tagged (static tags) with XYZ systems). In step 124, rule module 42 may allow user 16 to determine if all appropriate conditions have been included in the query. If not over, nested groups of conditions may be created in step 126 by looping back to step 122 to add conditions. When conditions for the query are over (e.g., all appropriate conditions have been included) as determined in step 124 the tags may applied to appropriate assets when saved. In one embodiment, tags may be applied automatically. For example, as new assets are added to the asset database, tags may be automatically applied when a scan is launched. The asset database can be searched for assets that match the dynamic tag query, tags can be applied to the matching assets, and the matching assets can be included in the scan. In addition, multiple tags, including static tags, may be applied to an asset.

Asset tag 30B may be added to an asset report template in step 128. Similarly, user 16 may add static asset tag 30A created in step 118 to the asset report template in step 128. In step 130, vulnerability set 26 may be optionally added to the asset report template to capture assets associated with selected vulnerabilities in vulnerability set 26. In step 132, an asset report may be created based on the asset report template. The asset report may have scan results for assets associated with asset tags 30A, 30B and/or vulnerability set 26. The process terminates in step 134.

The options for grouping computer vulnerabilities, as shown in the FIGURES herein, are for example purposes only. It will be appreciated that numerous other options, at least some of which are detailed herein in this Specification, may be provided in any combination with or exclusive of the options of the various FIGURES. Software for achieving the grouping computer vulnerabilities related operations outlined herein can be provided at various locations (e.g., the corporate IT headquarters, end user computers, distributed servers in the cloud, etc.). In some embodiments, this software could be received or downloaded from a web server (e.g., in the context of purchasing individual end-user licenses for separate networks, devices, servers, etc.) in order to provide this system for grouping computer vulnerabilities. In one example embodiment, this software is resident in one or more computers and/or web hosts sought to be protected from a security attack (or protected from unwanted or unauthorized manipulations of data).

In various embodiments, the software of system 10 for grouping computer vulnerabilities could involve a proprietary element (e.g., as part of a network security solution with McAfee® Vulnerability Manager (MVM) software, McAfee® ePolicy Orchestrator (ePO) software, etc.), which could be provided in (or be proximate to) these identified elements, or be provided in any other device, server, network appliance, console, firewall, switch, information technology (IT) device, distributed server, etc., or be provided as a complementary solution, or otherwise provisioned in the network.

In certain example embodiments, the activities related to grouping computer vulnerabilities as outlined herein may be implemented in software. This could be inclusive of software provided in vulnerability manager 20 and in other network elements (e.g., scan engine 14). These elements and/or modules can cooperate with each other in order to perform the activities related to grouping computer vulnerabilities as discussed herein. In other embodiments, these features may be provided external to these elements, included in other devices to achieve these intended functionalities, or consolidated in any appropriate manner. For example, some of the processors associated with the various elements may be removed, or otherwise consolidated such that a single processor and a single memory location are responsible for certain activities. In a general sense, the arrangement depicted in FIGURES may be more logical in its representation, whereas a physical architecture may include various permutations, combinations, and/or hybrids of these elements.

In various embodiments, some or all of these elements include software (or reciprocating software) that can coordinate, manage, or otherwise cooperate in order to achieve the grouping computer vulnerabilities related operations, as outlined herein. One or more of these elements may include any suitable algorithms, hardware, software, components, modules, interfaces, or objects that facilitate the operations thereof. In the embodiment involving software, such a configuration may be inclusive of logic encoded in one or more tangible media, which may be inclusive of non-transitory media (e.g., embedded logic provided in an application specific integrated circuit (ASIC), digital signal processor (DSP) instructions, software (potentially inclusive of object code and source code) to be executed by a processor, or other similar machine, etc.).

In some of these instances, one or more memory elements (e.g., memory 38) can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, processor 36 could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

System 10 and other associated components in system 10 can include one or more memory elements (e.g., memory 38) for storing information to be used in achieving operations associated with the application assessment as outlined herein. These devices may further keep information in any suitable type of memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in system 10 (e.g., vulnerability sets 26, asset tags 30, discovered vulnerabilities, reports, etc) could be provided in any database, register, table, cache, queue, control list, or storage structure, based on particular needs and embodiments, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.' Each of the computers may also include suitable interfaces for receiving, transmitting, and/or otherwise communicating data or information in a network environment.

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of FIGURES may be combined in various possible configurations, all of which are clearly within the broad scope of this Specification. In certain cases, it may be easier to describe one or more of the functionalities of a given set of flows by only referencing a limited number of network elements. It should be appreciated that the system of FIGURES (and corresponding teachings) is readily scalable and can accommodate a large number of components, as well as more complicated/sophisticated arrangements and configurations. Accordingly, the examples provided should not limit the scope or inhibit the broad teachings of system 10 as potentially applied to a myriad of other architectures.

It is also important to note that the operations described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

What is claimed is:

1. A method comprising:
    providing a list of asset tags to be displayed by a graphical user interface (GUI) of a computer that includes a processor;
    creating, by an asset tag module, a dynamic asset tag based on a query comprising a plurality of conditions associated with at least one asset on a network;
    providing, by the asset tag module, a representation of the query comprising the plurality of conditions to be displayed by the GUI;
    scanning, by a scan module, one or more assets of the network for vulnerable content, wherein the scanning includes searching each of the one or more assets for two or more vulnerabilities included in a first vulnerability set selected from a plurality of vulnerability sets, wherein the two or more vulnerabilities represent a proper subset of a plurality of vulnerabilities, each one of the plurality of vulnerabilities included in at least one of the plurality of vulnerability sets;
    generating scan results based on the scanning;
    adding the dynamic asset tag to an asset report template;
    generating, by a report module, an asset report from the asset report template, wherein the asset report is based, at least in part, on the dynamic asset tag and the scan results;
    editing the dynamic asset tag by modifying the plurality of conditions in the query and by adding a second vulnerability set to the dynamic asset tag; and
    generating, by the report module, an updated asset report from the asset report template after the plurality of conditions in the query is modified, wherein the updated asset report is based on the modified plurality of conditions, the second vulnerability set, and the scan results.

2. The method of claim 1, wherein at least one condition is selected from a group comprising asset location, asset criticality, asset group name, asset label, asset owner, asset status, asset tag, authentication statistics, banners, Common Vulnerabilities and Exposures (CVE) number, false positives, host domain name system (DNS) name, host netBIOS name, Information Assurance Vulnerability Alert (IAVA) Number, Internet Protocol (IP) Address, Microsoft Knowledge Base (KB) Number, open ports, operating system, protocol name, scan name, vulnerability name, vulnerability severity, and vulnerability set.

3. The method of claim 1, wherein the updated asset report comprises a list of assets on the network meeting the modified plurality of conditions in the query.

4. The method of claim 1, wherein the editing the dynamic asset tag includes adding a new condition to the query.

5. The method of claim 1, wherein the dynamic asset tag comprises:
    a second asset tag configured to be updated automatically; and
    a third asset tag configured to be updated manually.

6. The method of claim 5, further comprising updating the second asset tag automatically when the dynamic asset tag is updated.

7. The method of claim 1, wherein the asset report corresponds to, at least, a pre-configured vulnerability set and the vulnerable content.

8. An apparatus comprising:
    a memory including data stored therein;
    a hardware processor operable to execute instructions associated with the data;
    an asset tag module configured to run on the hardware processor for:
        providing a list of asset tags to be displayed by a graphical user interface (GUI) of a computer that includes a processor;
        creating a dynamic asset tag based on a query comprising a plurality of conditions associated with at least one asset on a network; and
        providing a representation of the query comprising the plurality of conditions to be displayed;
    a scan module configured to run on the hardware processor for:
        scanning one or more assets of the network for vulnerable content, the scanning to include searching each of the one or more assets for two or more vulnerabilities included in a first vulnerability set selected from a plurality of vulnerability sets, wherein the two or more vulnerabilities represent a proper subset of a plurality of vulnerabilities, each one of the plurality of vulnerabilities included in at least one of the plurality of vulnerability sets; and
        generating scan results based on the scanning; and
    a report module configured to run on the hardware processor for:
        adding the dynamic asset tag to an asset report template;
        generating an asset report from the asset report template, wherein the asset report is based, at least in part, on the dynamic asset tag and the scan results; and
        generating an updated asset report from the asset report template after the dynamic asset tag is edited by modifying the plurality of conditions in the query and by adding a second vulnerability set to the dynamic asset tag, wherein the updated asset report is based on the modified plurality of conditions, the second vulnerability set, and the scan results.

9. The apparatus of claim 8, wherein at least one condition is selected from a group comprising asset location, asset criticality, asset group name, asset label, asset owner, asset status, asset tag, authentication statistics, banners, Common Vulnerabilities and Exposures (CVE) number, false positives, host domain name system (DNS) name, host netBIOS name, Information Assurance Vulnerability Alert (IAVA) Number, Internet Protocol (IP) Address, Microsoft Knowledge Base (KB) Number, open ports, operating system, protocol name, scan name, vulnerability name, vulnerability severity, and vulnerability set.

10. The apparatus of claim 8, wherein the dynamic asset tag is to be edited by adding a new condition to the query.

11. Non-transitory media that includes code for execution and when executed by a processor is operable to perform operations comprising:

providing a list of asset tags to be displayed by a graphical user interface (GUI) of a computer that includes a processor;

creating a dynamic asset tag based on a query comprising a plurality of conditions associated with at least one asset on a network;

providing a representation of the query comprising the plurality of conditions to be displayed;

scanning one or more assets of the network for vulnerable content, the scanning to include searching each of the one or more assets for two or more vulnerabilities included in a first vulnerability set selected from a plurality of vulnerability sets, wherein the two or more vulnerabilities represent a proper subset of a plurality of vulnerabilities, each one of the plurality of vulnerabilities included in at least one of the plurality of vulnerability sets;

generating scan results based on the scanning;

adding the dynamic asset tag to an asset report template;

generating an asset report from the asset report template, wherein the asset report is based, at least in part, on the dynamic asset tag and the scan results;

editing the dynamic asset tag by modifying the plurality of conditions in the query and by adding a second vulnerability set to the dynamic asset tag; and generating an updated asset report from the asset report template after the plurality of conditions in the query is modified, wherein the updated asset report is based on the modified plurality of conditions, the second vulnerability set, and the scan results.

12. The media of claim 11, wherein at least one condition is selected from a group comprising asset location, asset criticality, asset group name, asset label, asset owner, asset status, asset tag, authentication statistics, banners, Common Vulnerabilities and Exposures (CVE) number, false positives, host domain name system (DNS) name, host netBIOS name, Information Assurance Vulnerability Alert (IAVA) Number, Internet Protocol (IP) Address, Microsoft Knowledge Base (KB) Number, open ports, operating system, protocol name, scan name, vulnerability name, vulnerability severity, and vulnerability set.

13. The media of claim 11, wherein the asset report corresponds to, at least, a pre-configured vulnerability set and the vulnerable content.

14. The media of claim 11, wherein the dynamic asset tag is to be edited by adding a new condition to the query.

15. The media of claim 11, wherein the updated asset report comprises a list of assets on the network meeting the modified plurality of conditions in the query.

16. The media of claim 11, wherein the dynamic asset tag comprises:

a second asset tag configured to be updated automatically; and a third asset tag configured to be updated manually.

17. The media of claim 16, further comprising updating the second asset tag automatically when the dynamic asset tag is updated.

18. The media of claim 11, wherein the dynamic asset tag is to be edited by deleting a condition of the plurality of conditions of the query.

19. The media of claim 11, further comprising:

when the edited dynamic asset tag is used in the asset report template, applying an asset tag name associated with the edited dynamic asset tag to any asset in the network that meets the modified plurality of conditions in the query.

20. The media of claim 11, wherein the generating the updated asset report comprises:

selecting, from the scan results, information associated with one or more assets that meet the modified plurality of conditions in the query, wherein the information is to be included in the updated asset report.

* * * * *